United States Patent [19]

Slater

[11] 4,074,981
[45] Feb. 21, 1978

[54] PARTIAL OXIDATION PROCESS
[75] Inventor: William L. Slater, La Habra, Calif.
[73] Assignee: Texaco Inc., New York, N.Y.
[21] Appl. No.: 749,658
[22] Filed: Dec. 10, 1976
[51] Int. Cl.² ............................................... C10J 1/00
[52] U.S. Cl. ..................................... 48/197 R; 48/206;
60/39.02; 252/373
[58] Field of Search ..................... 48/197 R, 206, 215;
60/39.12, 39.18 B, 648, 39.02; 252/373

[56] References Cited
U.S. PATENT DOCUMENTS

| | | | |
|---|---|---|---|
| 3,607,157 | 9/1971 | Schlinger et al. ........................ | 48/206 |
| 3,868,817 | 3/1975 | Marion et al. ........................ | 60/39.12 |
| 3,922,148 | 11/1975 | Child ................................. | 48/197 R |

*Primary Examiner*—Robert L. Lindsay, Jr.
*Assistant Examiner*—George C. Yeung
*Attorney, Agent, or Firm*—Thomas H. Whaley; Carl G. Ries; Albert Brent

[57] ABSTRACT

A continuous process for producing simultaneously a stream of cooled clean synthesis gas, reducing gas, or fuel gas and a separate stream of superheated steam. In the subject process a hydrocarbonaceous fuel is reacted with a free-oxygen containing gas by partial oxidation in the reaction zone of a free-flow noncatalytic gas generator. The effluent gas stream from the reaction zone is quenched in water in a quench zone and further cooled by being passed serially through first and second heat exchange zones to produce a product gas stream of cooled clean synthesis gas, fuel, or reducing gas. Simultaneously, a stream of boiler feed water is converted into superheated steam by stepwise sequential indirect heat exchange with the following sources of heat: first with a stream of carbon-quench water dispersion from said quench zone, second with said effluent gas stream in said second heat exchange zone, and third with the effluent gas stream in said first heat exchange zone. Optionally, the process gas stream may be cooled further, scrubbed with water, passed through a separating zone to remove entrained water, and expanded in a gas turbine for the production of mechanical or electrical energy.

8 Claims, 1 Drawing Figure

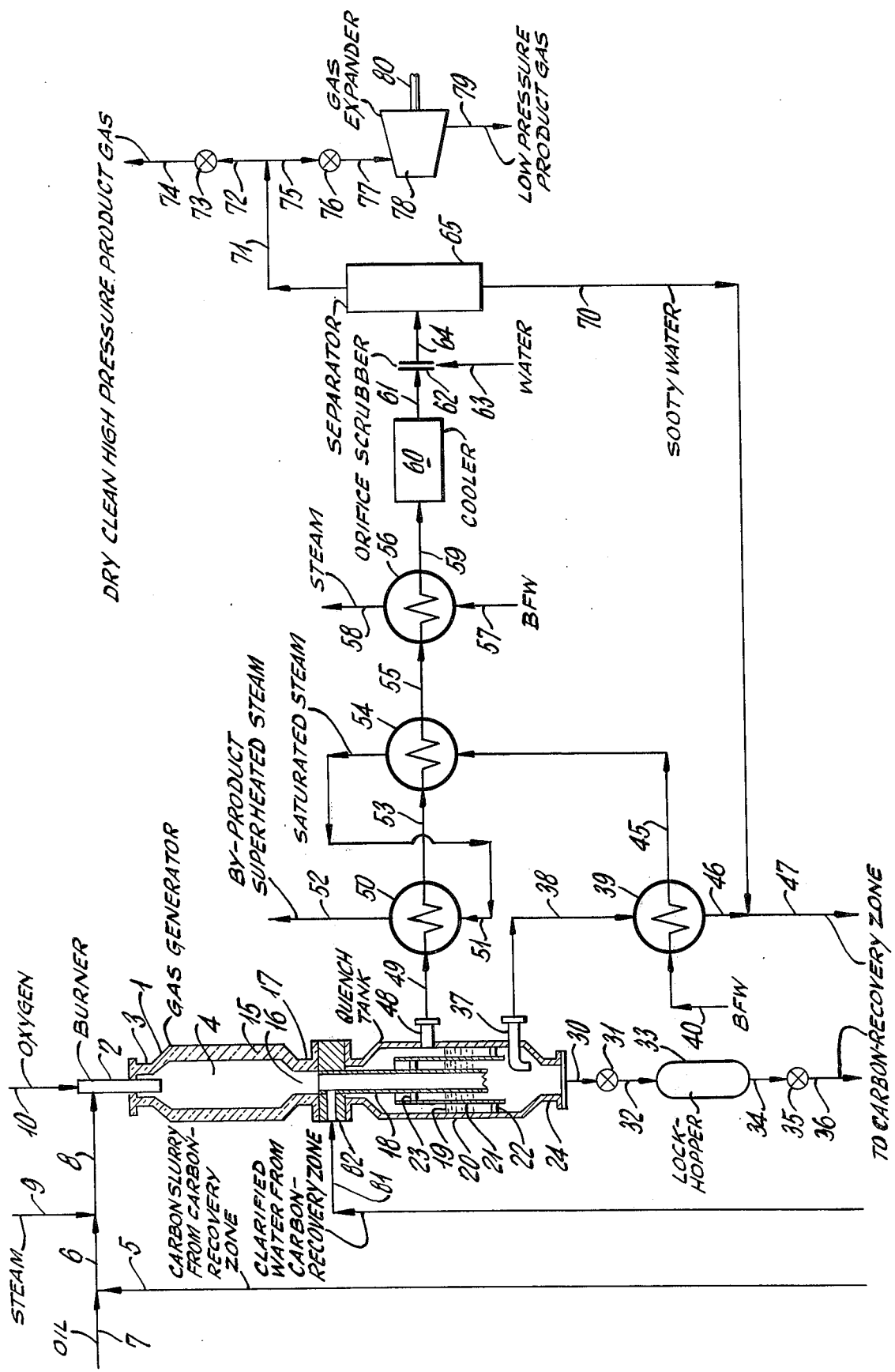

PARTIAL OXIDATION PROCESS

BACKGROUND OF THE INVENTION

1. Field of the Invention

This is a process for producing a stream of cooled clean synthesis gas and a separate stream of superheated steam.

2. Description of the Prior Art

Synthesis gas may be prepared by the partial oxidation of a fossil fuel with a free-oxygen containing gas, optionally in the presence of a temperature moderator. The effluent gas stream from the gas generator is cooled below the equilibrium temperature for the desired gas composition by, for example, direct immersion in water in the quench tank such as described in coassigned U.S. Pat. No. 2,896,927. By this method of gas cooling the sensible heat in the effluent gas stream is not used at its highest temperature to produce steam. Accordingly, the thermal efficiency of the process is reduced.

SUMMARY

This is a continuous process for producing simultaneously a stream of cooled clean synthesis gas, reducing gas, or fuel gas and a separate stream of superheated steam.

In the subject process a hydrocarbonaceous fuel is reacted with a free-oxygen containing gas by partial oxidation in the reaction zone of a free-flow noncatalytic gas generator. The effluent gas stream from the reaction zone is quenched in water in a quench zone and further cooled by being passed serially through a first heat exchange zone in indirect heat exchange with a stream of saturated steam from a second heat exchange zone. The saturated steam is converted into a stream of by-product superheated steam having a pressure in the range of about 10 to 555 psig in said first heat exchange zone, and the temperature of the gas stream is reduced to about 250° to 580° F. The gas stream is then introduced into a said second heat exchange zone in indirect heat exchange with a stream of boiler feed water at a temperature in the range of about 300° to 600° F. The boiler feed water is converted to saturated steam at a pressure in the range of about 10 to 555 psig in said second heat exchange zone, and the temperature of the gas stream is reduced about 240° to 480° F. Prior to the second heat exchange zone, the boiler feed water is preheated in a third heat exchange zone by indirect heat exchange with a dispersion of particulate carbon and water removed from the bottom portion of quench zone.

Optionally, the process gas stream may be cooled further, scrubbed with water, passed through a separating zone to remove entrained water, and expanded in a gas turbine for the production of mechanical or electrical energy.

BRIEF DESCRIPTION OF THE DRAWING

The invention will be further understood by reference to the accompanying drawing. The drawing is a schematic representation of a preferred embodiment of the subject process for simultaneously producing a stream of cooled dry clean high pressure product gas, and a separate stream of superheated steam.

DESCRIPTION OF THE INVENTION

In the first step of the subject process, a raw gas stream substantially comprising hydrogen and carbon monoxide, and having a mole ratio ($H_2/CO$) in the range of about 0.5 to 1.9 is produced by the partial oxidation of a hydrocarbonaceous fuel with a free-oxygen containing gas optionally in the presence of a temperature moderator in the reaction zone of an unpacked free-flow noncatalytic partial oxidation gas generator. The steam of fuel weight ratio in the reaction zone is in the range of about 0.1 to 5, and preferably about 0.2 to 0.7. The atomic ratio of free oxygen to carbon in the fuel (O/C ratio), is in the range of about 0.7 to 1.6, and preferably about 0.8 to 1.4. It is common practice to express ratios in this manner where the denominator of the ratio is one and the numerator is in the range specified, for example 0.8 to 1.4 for the preceding ratio. The reaction time is in the range of about 1 to 10 seconds, and preferably about 2 to 6 seconds.

The raw synthesis gas stream exits from the reaction zone at a temperature in the range of about 1500° to 3500° F., and preferably 2000° to 2800° F., and a pressure in the range of about 1 to 250 atmospheres, and preferably 15 to 150 atmospheres.

The composition of the raw gas stream leaving the partial oxidation gas generator in the mole percent may be about as follows: $H_2$ 20 to 70, $CO$ 60 to 15, $CO_2$ nil to 30, $H_2O$ nil to 15, $CH_4$ nil to 25, $H_2S$ nil to 5.0, $COS$ nil to 0.2, $NH_3$ nil to 5, $N_2$ nil to 60, A nil to 2.0 particulate carbon nil to 20 weight percent (basis carbon in original feed), ash nil to 60 weight percent (basis weight of original hydrocarbonaceous feed). When used as synthesis gas, the amounts of $H_2$ and $CO$ in the gas stream are maximized. For use as a reducing gas the amounts of $CO_2$, $H_2O$ and $N_2$ in the gas stream are minimized. For use as a fuel gas having a high heating value, the amount of $H_2$, $CO$, and $CH_4$ in the gas stream are maximized.

The gas generator comprises a vertical cylindrically shaped steel pressure vessel lined with refractory, such as shown in coassigned U.S. Pat. No. 2,809,104. A typical quench tank is also shown in said patent. A single-annulus burner, such as shown in coassigned U.S. Pat. No. 2,928,460 or a multiple-annulus type burner such as shown in coassigned U.S. Pat. No. 3,705,108 may be used to introduce the feedstreams into the reaction zone.

A wide range of combustible carbon containing organic materials may be reacted in the gas generator with a free-oxygen containing gas optionally in the presence of a temperature moderating gas to produce the raw effluent gas stream.

The term hydrocarbonaceous as used herein to describe various suitable feedstocks is intended to include gaseous, liquid, and solid hydrocarbons, carbonaceous materials, and mixtures thereof. In fact, substantially any combustible carbon containing organic material, or slurries thereof, may be included within the definition of the term "hydrocarbonaceous." For example, there are (1) pumpable slurries of solid carbonaceous fuels, such as coal, particulate carbon, petroleum coke, concentrated sewer sludge, and mixtures thereof, in a vaporizable carrier such as water, liquid hydrocarbon fuel and mixtures thereof; (2) gas-solid suspensions; such as finely ground solid carbonaceous fuels dispersed in either a temperature-moderating gas or in a gaseous hydrocarbon; and (3) gas-liquid-solid dispersions, such as atomized liquid hydrocarbon fuel or water and particulate carbon dispersed in a temperature moderating gas. The hydrocarbonaceous fuel may have a sulfur content in the range of about 0 to 10 weight percent and an ash content in the range of about 0 to 60 weight percent.

The term liquid hydrocarbon, as used herein to describe suitable liquid feedstocks, is intended to include various materials, such as liquefied petroleum gas, petroleum distillates and residua, gasoline, naphtha, kerosine crude petroleum, asphalt, gas oil, residual oil, tar-sand oil and shale oil, coal derived oil, aromatic hydrocarbon (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphthenic, and aromatic compounds in any proportion.

Also included within the definition of the term hydrocarbonaceous are oxygenated hydrocarbonaceous organic material including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature, or it may be preheated to a temperature up to as high as about 600° to 1200° F., but preferably below its cracking temperature. The hydrocarbonaceous feed may be passed through the burner in liquid phase or in a vaporized mixture with a temperature moderator.

The use of a temperature moderator to moderate the temperature in the reaction zone depends in general on the carbon to hydrogen ratio of the feedstock and the oxygen content of the oxidant stream. A temperature moderator may not be required with some gaseous hydrocarbon fuels; however, generally one is used with liquid hydrocarbon fuels and with substantially pure oxygen. The temperature moderator may be introduced in admixture with either or both reactant streams. Alternatively, the temperature moderator may be introduced into the reaction zone of the gas generator by way of a separate conduit in the fuel burner. It may be in the liquid or gaseous phase. Suitable temperature moderators include $H_2O$, $CO_2$-rich gas, cooled clean gas from the gas generator or from a gas turbine which may be employed downstream in the process with or without admixture with air, by-product nitrogen from the air separation unit to be further described, and mixtures of the aforesaid temperature moderators.

The term free-oxygen containing gas, as used herein, is intended to include air, oxygen-enriched air, i.e. greater than 21 mole percent oxygen, and substantially pure oxygen i.e. greater than 95 mole percent oxygen (the remainder comprising $N_2$ and rare gases). Free-oxygen containing gas may be introduced into the burner at a temperature in the range of about ambient to 1200° F. The ratio of free-oxygen in the oxidant to carbon in the feedstock (O/C atom/atom) is in the range of about 0.70 to 1.6 and preferably about 0.80 to 1.4. Substantially pure oxygen is preferred to reduce the amount of nitrogen and other gaseous impurities in the product gas.

The hot effluent gas stream from the reaction zone of the gas generator is passed directly into a quench zone where it is cooled below the reaction temperature to a temperature in the range of about 300–900° F. For example, the cooling water at a temperature in the range of about 50° to 600° F. may contact the effluent gas stream at a temperature in the range of about 1300° to 3000° F. in a quench vessel or chamber located below the reaction zone of said gas generator. Recycle water from a carbon recovery zone or clean carbon-water dispersion to be further described may be introduced through a spray ring at the top of the quench zone. Large quantities of steam are generated in the quench vessel and saturate the process gas stream. A suitable quench tank containing the cooling water is shown in coassigned U.S. Pat. No. 2,896,927 and comprises a carbon-steel quench vessel or chamber located immediately downstream from the reaction zone of said gas generator. A large diameter dip leg starting at the bottom end of the reaction zone and discharging beneath the water level in the quench chamber serves as an interconnecting passage between the reaction zone and the quench zone through which the hot product gases pass. This also substantially equalizes the pressure in the two zones. A concentric draft tube, open on both ends, surrounds said dip leg, creating an annulus through which the mixture of gas and water rises vigorously. The water and gas then separate in the quench chamber in the space outside the draft tube. This circulation of water through the draft tube system maintains the entire quench system at essentially the temperature of the water leaving the quench vessel, which is also the temperature of the saturated steam in the quench zone.

Recycle water from the carbon-recovery zone is normally introduced through a quench ring at the top of the dip leg to cool the metal at that point. Large quantities of steam are generated in the quench vessel and the quench chamber may be likened to a high-output, high-pressure boiler.

The turbulent condition in the quench chamber, caused by the large volumes of gases bubbling up through said annulus space, helps the water to scrub substantially all of the solids from the effluent gas, forming a dispersion of free carbon soot, or unconverted particulate petroleum coke, or a mixture of both in the quench water. Additional steam required for any subsequent shift conversion step may be picked up during quenching.

Noncombustible solid particles such as ash, slag, metal constituents, metal silicates and other solids which do not disperse in the quench water drop to the bottom of the quench vessel where they are periodically removed through a lock hopper system. This residue has some commercial value and may be used as a soil improver, or it may be sent to a metals reclaiming unit. For example, coal ash may be removed from the flanged exit port at the bottom of the quench tank by way of the lock hopper system shown in the drawing. For each 100 pounds of raw ground coal fed to the gas generator about 0 to 50 pounds of ash are produced. On a dry basis the ash residue may comprise in weight percent $SiO_2$ 10 to 50, $Al_2O_3$ 10 to 50, iron oxides and sulfides 0 to 40, and others.

It is important with respect to the economics of the process that the solid particles e.g. particulate carbon and ash be removed from the cooling and scrubbing water to permit the resulting clear water to be recycled and reused for cooling and scrubbing additional synthesis gas. This may take place in a liquid-solids separating zone.

In the carbon-recovery zone any conventional method may be used for separating clear water from the particulate carbon-water slurry comprising about 0.5 to 8 weight percent of solids which is continuously being removed near the bottom of the quench zone. For example, naphtha may be used to displace the water from the carbonwater dispersion. Other methods include separation of clear water from the dispersion by gravity settling, centrifuge, and filtration.

In the preferred embodiment of the process, the particulate carbon-water dispersion is mixed with a light hydrocarbon liquid fuel such as naphtha forming a light hydrocarbon liquid fuel-particulate carbon slurry and a clarified water phase. The clarified water phase is then separated from the light hydrocarbon liquid fuel-particulate carbon slurry in a decanter, optionally admixed with makeup water, and recycled for use in a quench cooling and scrubbing more effluent synthesis gas from the gas generator. The temperature of this recycled clarified water is in the range of about 40° to 600° F. Low cost fuel oil is then mixed with the light hydrocarbon liquid fuel-particulate carbon slurry. In a distillation column the light hydrocarbon liquid fuel is distilled off and reused to extract more carbon from the aforesaid particulate carbon-water dispersion. Hot fuel oil-particulate carbon slurry containing about 5 to 20 weight percent of carbon is removed from the bottom of the distillation column, optionally mixed with additional fuel oil, and recycled to the gas generator.

Alternately, the particulate carbon-water dispersion may be introduced into a suitable standard gravity sedimentation unit, for example one described in Perry's Chemical Engineers Handbook 4th edition, 1968, pages 19–42 to 19–54. Separation or concentration of the carbon particles by filtration or centrifuging may also be employed.

The dispersion of particulate carbon and water leaves near the bottom of the quench tank at a temperature in the range of about 300° to 600° F. Before entering the carbon-recovery zone, the carbon-water dispersion is passed through a heat exchange zone in indirect (non-contact) heat exchange with a stream of boiler feed water (BFW). The carbon-water dispersion is cooled to a temperature in the range of about 150 to 550° F. The heat exchange zone may be a separate conventional heat exchanger, for example a shell and tube type.

The process gas stream leaves from the upper portion of the quench tank at a temperature in the range of about 300° to 600° F. and at pressure in the range of about 1 to 250 atmospheres, and preferably at the same pressure as in the reaction zone, less ordinary drop in the lines and equipment. At this point the process gas stream is saturated with water vapor. It is then cooled stepwise by being passed serially through two separate heat exchange zones. For example, in a first heat exchange zone, the process gas stream may be cooled to a temperature in the range of about 250° to 580° F. by indirect heat exchange with a stream of saturated steam which directly enters the first heat exchange zone after leaving a second heat exchange zone at a pressure in the range of about 10 to 555 psig. The saturated steam is converted in the first heat exchange zone to by-product superheated steam having a pressure in the range of about 10 to 555 psig. The degree of superheat is in the range of about 20° to 250° F.

The process gas stream leaving the first heat exchange zone directly enters said second heat exchange zone and is further cooled to a temperature in the range of about 240° to 480° F. by indirect heat exchange with the aforesaid stream of boiler feed water which was preheated from a temperature in the range of about 100° to 500° F. to a temperature in the range of about 115° to 460° F. by indirect heat exchange with said carbon-water in a separate heat exchange zone, as previously described. The first and second heat exchange zones may comprise conventional heat exchange equipment contained in separate but interconnected shells. Alternately, the first and second heat exchange zones may be contained in the same shell. Optionally, clarified water from the carbon-recovery zone may be periodically injected into the process gas stream entering the first and second heat exchangers in order to wash down the tubes and heat exchange surfaces.

The process gas stream leaving the second heat exchange zone may be cooled further to a temperature in the range of about 230° to 470° F. by being passed directly into a separate third heat exchange zone in indirect heat exchange with boiler feed water. The boiler feed water enters at a temperature in the range of about 100° to 450° F. and leaves as steam at a pressure in the range of about 6 to 495 psig. The third heat exchange zone may be a conventional heat exchanger.

The process gas stream leaving the third heat exchange zone is cooled to a temperature in the range of about 40° to 400° F. in a conventional gas cooler i.e. air or refrigeration and then contacted with water in a conventional gas scrubbing zone i.e. orifice or venturi scrubber to remove any remaining entrained solid particles. Then in a conventional gas-liquid separating zone, such as a separating tank and demister, a bottoms stream of sooty water is separated from an overhead stream of substantially dry clean high pressure product gas. The product gas stream may be synthesis gas, reducing gas, or fuel gas. It is produced at substantially the same pressure as in said gas generator less ordinary drop in the lines and equipment. The sooty water is sent to the previously described carbon-recovery zone for processing. Optionally, at least a portion of said high pressure product gas is passed through a conventional gas expander such as a turbine as the working fluid. The turbine may drive a gas compressor or an electric generator. The exhaust from the expansion turbine comprises clean low pressure product gas.

DESCRIPTION OF THE DRAWING

A more complete understanding of the invention may be had by reference to the accompanying schematic drawing.

With reference to the drawing, unpacked, free-flow noncatalytic refractory lined gas generator 1, as previously described has an annulus-type burner 2 mounted in its upper inlet port 3 along the vertical axis. The following feedstreams may be introduced into the reaction zone 4 of gas generator 1 by way of burner 2: (1) a slurry of particulate carbon in a carrier e.g. oil or water in line 5 which is mixed in line 6 with a liquid hydrocarbonaceous fuel e.g. oil from line 7, and then mixed in line 8 with steam from line 9 and passed through the annulus passage (not shown) in burner 2; and (2) a stream of free-oxygen containing gas in line 10 which is passed through the central conduit (not shown) of burner 2. Alternately, the free-oxygen containing gas optionally in admixture with steam may be passed through the annular passage of burner 2, while the liquid hydrocarbonaceous fuel is passed through the central passage.

Free-flow gas generator 1 is lined with refractory 15. After partial oxidation of the hydrocarbonaceous fuel, the effluent gas stream produced in the reaction zone 4 passes through axial passage 16 and generator outlet 17 at the downstream end of gas generator 1. The effluent gas stream passes down through dip leg 18 into a pool of quench water 19 contained in the bottom of quench tank 20. The direction of the process gas stream is reversed in the quench water and the gases then rise up through concentric draft tube 21 which is held in place by space bars 22 and 23. Substantially all of the solid matter i.e. ash, carbon, metals may be thereby scrubbed out of the process gas stream by the turbulent quench water in the quench tank. Periodically, a water slurry of said solid matter is removed and sent to a liquid-solids separating zone as previously decribed (not shown) by way of outlet 24 in the bottom of quench tank 20 and a conventional lock hopper system comprising line 30, valve 31, line 32, chamber 33, line 34, valve 35, and line 36.

A continuous stream of particulate carbon-water dispersion having a solids content in the range of about 0.5 to 8 weight percent is removed through outlet 37 near the bottom of quench tank 20 and is cooled by being passed through line 38, heat exchanger 39 in indirect heat exchange with boiler feed water which enters heat exchanger 39 through line 40 and leaves at a higher temperature by way of line 45. The cooled carbon-water dispersion is then passed into a previously described carbon-recovery zone (not shown) by way of lines 46 and 47.

Clarified water separated from the carbon-recovery zone is recycled to quench tank 20 along with fresh water as make-up by way of line 81 and inlet 82. A slurry of particulate carbon and oil from the carbon-recovery zone is recycled to burner 2 in gas generator 1 as at least a portion of the fuel by way of lines 5, 6 and 8, as previously described.

The partially cooled process gas stream leaving quench tank 20 by way of outlet 48 located in the upper part of the quench tank above the surface of the quench water passes through line 49 into heat exchanger 50. The process gas stream is cooled in heat exchanger 50 by indirect heat exchange with a stream of saturated steam which enters through line 51 and leaves as by-product superheated steam in line 52.

The process gas stream leaving heat exchanger 50 through line 53 is passed directly into heat exchanger 54 where it is cooled further by indirect heat exchange with the previously mentioned preheated boiler feed water from line 45. The boiler feed water is converted into saturated steam in heat exchanger 54 and leaves by line 51. As previously discussed, the saturated steam in line 51 is converted into superheated steam in heat exchanger 50.

The process gas stream leaving heat exchanger 54 is cooled still further by being passed through line 55 into heat exchanger 56. There it passes in indirect heat exchange with boiler feed water which enters through line 57. and leaves as steam through line 58. The process gas stream leaving heat exchanger 56 through line 59 is then cooled to a lower dew point in conventional cooler 60 i.e. by air of refrigeration in order to condense out the water in the gas stream.

The process gas stream in line 61 is then passed through an orifice scrubber 62 where all of the remaining entrained particulate carbon is scrubbed out by means of water which enters through line 63. The process gas stream in line 64 is then passed into gas-liquid separator 65 where a stream of sooty water separates and is removed through line 70 at the bottom and which may be sent to the carbonrecovery zone through line 47.

A product gas stream of dry clean high pressure synthesis, reducing or fuel gas may be removed through lines 71-72, valve 73, and line 74. Alternately, at least a portion of the high pressure gas stream may be passed through line 75, valve 76, line 77 and expanded in a gas expander i.e. turbine 78. Low pressure product gas leaves by way of line 79. The turbine may be used to drive a compressor or an electric generator. For example, mechanical power from shaft 80 may be used to drive an air compressor in the air separation unit (not shown) for producing substantially pure oxygen which may be fed to the gas generator as the freeoxygen containing gas.

EXAMPLE

The following example illustrates a preferred embodiment of the process of this invention. While a preferred mode of operation is illustrated, the example should not be construed as limiting the scope of the invention. The process is continuous and the flow rates are specified on an hourly basis for all streams of materials.

The charge to a free-flow noncatalytic refractory lined synthesis gas generator comprises 24,538 pounds of oil and 462 pounds of particulate carbon at a temperature of 300° F.; 7500 pounds of steam at a temperature of 900° F., and 26,500 pounds of substantially pure oxygen at a temperature of 300° F. The ultimate analysis of the oil in weight percent is as follows: C 85.0, $H_2$ 11.0, S 3.5, N 0.4, and ash 0.1. Reaction by partial oxidation takes place at a pressure of 1000 psig and a temperature of 2525° F. The effluent gas stream from the reaction zone has the following composition in volume percent; $H_2$ 42.3, CO 45.7, $H_2O$ 7.6, $CO_2$ 2.9, $H_2S$ 0.8, $CH_4$ 0.6, and $N_2$ 0.1. The effluent gas stream from the reaction zone is quenched in water contained in a quench tank that is fed with recycle clarified water from the carbon-recovery system. Substantially all of the particulate carbon entrained in the effluent gas stream is removed and forms a dispersion of particulate carbon-water containing about 1 weight percent carbon in the bottom of the quench tank.

A process gas stream is removed near the top of the quench tank at a temperature of about 475° F. and 42,500 pounds of particulate carbon-water is removed near the bottom of the quench tank. The carbon-water dispersion at a temperature of about 475° F. is passed through a heat exchanger in indirect heat exchange with boiler feed water at a temperature of 150° F. By this means, the boiler feed water is heated to a temperature of 260° F. and the carbon-water dispersion is cooled to 330° F. The cooled carbon-water dispersion is then mixed with 11,800 pounds of sooty water containing about 0.05 weight percent of carbon soot obtained from a downstream gas scrubbing step, to be further described, at a temperature of 100° F. The mixed streams of carbon-water at a temperature of 190° F. are then mixed with recycle naphtha at 230° F. and introduced into a conventional carbon decanter. Clarified water at a temperature of 195° F. is drawn off from the bottom of the decanter and recycled to the quench tank, as previously described. A naphtha-soot dispersion is removed from the top of the decanter, mixed with heavy oil, and introduced into a distillation column. Naphtha from the top of the column at a temperature of 230° F. is recycled to contact said mixed streams of carbon-water. A slurry of oil and carbon from the bottom of the column is recycled to the gas generator as a portion of the feed.

The first gas stream removed near the top of the quench tank is passed through a first heat exchanger in indirect heat exchange with a stream of saturated steam that was produced in a second heat exchanger and which enters the first heat exchanger at a pressure of 139 psig. 55,800 pounds of by-product superheated steam at a temperature of 460° F. (100° F. superheat) and a pressure of 139 psig leave the first heat exchanger.

The process gas stream leaving the first heat exchanger is passed through said second heat exchange in indirect heat exchange with a stream of preheated boiler feed water, as previously produced, at a temperature of 260° F. In the second heat exchanger, the preheated water is converted into saturated steam having a pressure of 139 psig. The saturated steam is then passed into said first heat exchanger to cool the process gas stream, as previously described. The process gas stream leaves said second heat exchanger at a temperature of 360° F. and passes into a third heat exchanger where it is further cooled by indirect heat exchange with boiler feed water at a temperature of 150° F. The boiler feed water is converted into steam at 50 psig in said third heat exchanger i.e. waste heat boiler.

The process gas stream leaves the third heat exchanger at a temperature of 298° F. and is then cooled further, for example, by means of an air cooler. The process gas stream is then scrubbed with 2800 pounds of cold water in an orifice scrubber.

The process gas stream is now at a temperature of 100° F. and is introduced into a gas-liquid separator where 1.21 million standard cubic feet of dry clean high pressure synthesis gas product are removed from the top and 67,300 pounds of sooty water at a temperature of 100° F. are removed from the bottom. This sooty water is mixed with the carbon-water dispersion that was passed in heat exchange with the boiler feed water, as originally described, and the mixture is sent to the carbon-recovery zone.

Optionally, at least a portion of the product gas stream of dry clean high pressure synthesis gas may be expanded in a turbine to produce low pressure synthesis gas. The turbine shaft power may be used to drive a gas compressor or an electric generator. Thus, air fed to an air separation unit to produce substantially pure oxygen for use in the gas generator may be compressed in a turbo compressor in which the working fluid is said dry clean high pressure synthesis gas.

Obviously, various modifications of the invention as herein set forth may be made without departing from the spirit and scope thereof and therefore, only such limitations should be made as are indicated in the appended claims.

I claim:

1. In a process for producing systhesis gas, reducing gas, or fuel gas by the partial oxidation of a hydrocarbonaceous fuel with a free-oxygen containing gas, optionally with a temperature moderator, in the reaction zone of a free-flow noncatalytic gas generator at a temperature in the range of about 1500° to 3500° F. and a pressure in the range of about 1 to 250 atmospheres; and cooling and cleaning the effluent gas stream from the reaction zone by direct contact with water in a quench zone thereby producing a dispersion of particulate carbon and quench water; the improvement comprising:

(1) cooling the process gas stream leaving the quench zone at a temperature in the range of about 300° to 600° F. and a pressure in the range of about 1 to 250 atmospheres stepwise by passing said process gas stream serially through a first heat exchange zone where it is cooled by indirect heat exchange with a coolant to a temperature in the range of about 250° to 580° F. and then through a second heat exchange zone where it is cooled by indirect heat exchange with a coolant to a temperature in the range of about 240° to 480° F.

(2) passing at least a portion of the particulate carbon-quench water dispersion from said quench zone at a temperature in the range of about 300° to 600° F. through a third heat exchange zone in indirect heat exchange with boiler feed water which enters said third heat exchange zone and which leaves at a higher temperature in the range of about 115° to 460° F. while cooling said carbon-quench water dispersion to a temperature in the range of about 150° to 550° F.;

(3) passing the boiler feed water leaving said third heat exchange zone in (2) through said second heat exchange zone in (1) as said coolant, thereby converting said boiler feed water into saturated steam at a pressure in the range of about 10 to 555 psig.; and (4) passing said saturated steam from (3) through said first heat exchange zone in (1) as said coolant, thereby converting said saturated steam into superheated steam at a pressure in the range of about 10 to 555 psig and an amount of superheat in the range of about 20° to 250° F.

2. The process of claim 1 wherein the first and second heat exchange zones in step (1) are contained in separate but interconnected vessels.

3. The process of claim 1 wherein the first and second heat exchange zones in step (1) are contained in the same vessel.

4. The process of claim 1 provided with the additional step of (5) cooling the process gas stream leaving the second heat exchange zone in step (1) to a temperature in the range of about 230° to 470° F. in a fourth heat exchange zone by indirect heat exchange with boiler feed water, thereby converting said boiler feed water into steam having a pressure in the range of about 6 to 495 psig.

5. The process of claim 4 provided with the additional steps of (6) cooling the process gas stream leaving said fourth heat exchange zone in a cooling zone to a temperature in the range of about 40° to 400° F.; (7) contacting the cooled process gas stream with water in a gas scrubbing zone to remove any remaining entrained solid particles; (8) in a separating zone separating a dry clean high pressure stream of product gas from a separate stream of water containing solid particles; (9) mixing said stream of water and solid particales with the carbon-quench water dispersion leaving said third heat exchange zone in step (2), and introducing said mixture into a solids separation zone; (10) recovering clarified water from said solids separation zone and recycling at least a portion of said water at a temperature in the range of about 40° to 600° F. to said quench zone; and (11) recovering a pumpable carbon slurry from said solids separation zone, and recycling same to the gas generator as a portion of said hydrocarbonaceous fuel.

6. The process of claim 5 provided with the additional step of expanding at least a portion of said dry clean high pressure synthesis gas from step (8) in an expansion turbine to produce mechanical power and an exhaust stream of dry clean low pressure synthesis gas.

7. The process of claim 5 wherein said dry clean high pressure synthesis gas stream from step (8) is produced at substantially the same pressure as that in said gas generator less ordinary drop in the lines and equipment.

8. In a continuous process for producing reducing gas, synthesis gas, or fuel gas by the partial oxidation of a hydrocarbonaceous fuel with a free-oxygen containing gas, optionally with a temperature moderator, in the reaction zone of a free-flow noncatalytic gas generator at a temperature in the range of about 1500° to 3500° F. and a pressure in the range of about 1 to 250 atmospheres; and cooling and cleaning the effluent gas stream from the reaction zone by direct contact with water in a quench zone thereby producing a dispersion of particulate carbon and quench water; the improvement comprising:

(1) cooling the process gas stream leaving said quench zone by passing said process gas stream serially through first and second heat exchange zones in indirect heat exchange with a coolant;

(2) cooling at least a portion of the particulate carbon-quench water dispersion from said quench zone in a third heat exchange zone in indirect heat exchange with a stream of boiler feed water; and (3) passing the heated boiler feed water leaving said third heat exchange zone in (2) through said second heat exchange zone in (1) as said coolant, whereby said boiler feed water is converted into a stream of saturated steam; and (4) passing said stream of saturated steam from (3) through said first heat exchange zone in (1) as said coolant, whereby said saturated steam is converted into superheated steam.

* * * * *